(12) United States Patent
Weil

(10) Patent No.: US 6,616,002 B2
(45) Date of Patent: Sep. 9, 2003

(54) BARREL WITH TRAPDOOR

(75) Inventor: William J. Weil, Waverly, OH (US)

(73) Assignee: Canton Wood Products Company, Waverly, OH (US)

( * ) Notice: Subject to any disclaimer, the term of this patent is extended or adjusted under 35 U.S.C. 154(b) by 0 days.

(21) Appl. No.: 09/794,557

(22) Filed: Feb. 27, 2001

(65) Prior Publication Data

US 2002/0117474 A1 Aug. 29, 2002

Related U.S. Application Data

(60) Provisional application No. 60/246,180, filed on Nov. 6, 2000.

(51) Int. Cl.[7] .............................................. B65D 43/00
(52) U.S. Cl. .................................... 217/76; 220/592.19
(58) Field of Search .............................. 217/76, 72, 79, 217/88, 90, 91, 98, 99, 109, 110; 220/592.19, FOR 177, 592.18, 192.17, FOR 178

(56) References Cited

U.S. PATENT DOCUMENTS

| 199,405 | A |   | 1/1878  | Blye         |        |
|---------|---|---|---------|--------------|--------|
| 503,580 | A | * | 8/1893  | David et al. | 217/76 |
| 625,814 | A | * | 5/1899  | Terry, Jr.   | 217/76 |
| 744,879 | A | * | 11/1903 | Schleich     | 217/76 |
| 747,740 | A |   | 12/1903 | Malone       |        |
| 924,649 | A | * | 6/1909  | Emmrich      | 217/76 |
| 969,205 | A |   | 9/1910  | Shields      |        |
| 1,182,495 | A |   | 5/1916 | Liston       |        |
| 1,458,579 | A |   | 6/1923 | House        |        |
| 1,667,460 | A |   | 4/1928 | Hussey       |        |
| 2,069,531 | A |   | 2/1937 | Lehner       |        |
| 4,105,139 | A | * | 8/1978 | Scholle      | 222/105 |
| 5,052,570 | A |   | 10/1991 | Johansen    |        |
| 5,092,488 | A | * | 3/1992 | Pradel       | 220/320 |
| 5,188,402 | A | * | 2/1993 | Colgate et al. | 285/332 |
| 5,537,913 | A |   | 7/1996 | Vowles       |        |
| 5,702,018 | A | * | 12/1997 | Montgomery  | 220/203.13 |
| 5,740,935 | A | * | 4/1998 | Desfarges    | 217/110 |
| 6,183,982 | B1 | * | 2/2001 | Nastasia    | 435/41 |

FOREIGN PATENT DOCUMENTS

| DE | 265148    |   | 6/1912  |        |
|----|-----------|---|---------|--------|
| DE | 391568 C  |   | 3/1924  |        |
| DE | 28 22768 A |  | 11/1979 |        |
| GB | 870752    |   | 6/1961  |        |
| GB | 2167048   | * | 5/1986  | 217/76 |
| IT | 707593    |   | 5/1966  |        |

\* cited by examiner

*Primary Examiner*—Lee Young
*Assistant Examiner*—Lien Ngo
(74) *Attorney, Agent, or Firm*—Greenebaum Doll & McDonald PLLC; James C. Eaves, Jr.; Karen L. Lynd

(57) ABSTRACT

The barrel of the present invention contains a removable trapdoor which fits snugly into an aperture in the barrel and which is easily removed from the aperture, thereby providing for easy access to the interior of the barrel. The present invention provides distinct advantages over the prior art because it allows a worker lacking the skills of a cooper to remove or replace the wood chips or additional staves inside the barrel without removing a barrel head. Since the wood replacement can be done by regular employees, the barrels can be serviced when needed or convenient, rather than accumulating a large number of barrels for a cooper to service at one time.

8 Claims, 5 Drawing Sheets

BARREL WITH TRAPDOOR

This application claims the benefit of U.S. Provisional Application No. 60/246,180, filed Nov. 6, 2000.

BACKGROUND OF THE INVENTION (a) Field of the Invention

The present invention relates to a trapdoor in a barrel used for storing and aging alcoholic spirits or wine to allow ready access to the interior of the barrel. Accessing the interior of a barrel after construction and sealing of the head has been problematic. This invention provides a barrel which contains a convenient, fast and simple entry point for accessing the interior area of the barrel for addition and removal of material for aging the wine or spirits.

(b) Description of the Prior Art

The storing and aging of spirits and wine has historically been accomplished through the use of wood barrels, often made of oak. It is well known that oak imparts natural wood components to alcoholic spirits and wine which enhances flavor and adds other desirable characteristics during the aging process. Toasting the oak further enhances the flavors imparted.

The body of the barrel is generally of greater length than breadth and has a cross-section, with the largest diameter at the body middle portion with decreasing diameters towards the ends. The barrel body is traditionally made of wooden staves which are bound together by hoops, usually made of metal. A head, which is usually a flat wooden circular disc of wood, is removably attached at each end of the barrel towards the ends of the wooden staves, forming a generally flat top and bottom. The barrel is constructed to be liquid tight, although there is some natural evaporation of the wine through infiltration of air into the barrel through the wood. The barrel has a bunghole, which is usually a small hole with a usual diameter of two inches or less, for addition and removal of the wine or spirits. The bunghole is usually located on the barrel body and can be sealed with any of a variety of materials, such as a bung made of silicon or wood, which provides a liquid tight seal and does not chemically react with the wine or spirits in an adverse manner. However, barrels also may be constructed of certain types of metal or synthetic material and may be of any size or shape.

Unfortunately, wooden barrels are expensive and difficult to maintain, and may only be used for a limited period of time before they must be replaced. The natural wood components in the interior surface of the wooden barrels become depleted after several years of use and cease to impart flavor to the wine or spirits. After a few batches of wine or spirits have been aged in the containers, new containers must be used or new wood must be inserted in the barrel to provide a new source of wood components.

Wood barrels are expensive to produce, and winemakers have developed varying methods of prolonging the life of the barrel. An increasing number of wine or spirit makers now insert additional wooden staves made of oak or small pieces of wood derived from oak into used wood barrels in order to provide additional sources of wood for extraction of the wood compounds. The staves are usually mounted in a rack installed in the barrel. The wood pieces usually take the form of strips, rods, chips of irregular shapes or cubes. These wood pieces and wooden staves also become depleted and must be removed and replaced. This method of adding and removing racks, wooden staves and wood pieces is very difficult with traditional wine-making or spirits-making barrels. The barrel's bunghole is small, and it is very difficult, if not impossible, to remove the small wood pieces from the barrel through the bunghole. Removal of a barrel head is required to add, replace or remove the rack and additional wooden staves. Removal of the barrel head is difficult and can damage the barrel. Therefore, a trained cooper is typically required to remove the head and service the barrel. This process can be time consuming and high in labor costs.

The vast majority of wineries and distilleries do not have a cooper on site with the skills required to properly service the barrels. They must hire outside help and then coordinate the timing of the work to coincide with the availability of empty barrels in large enough quantities to make it feasible to have a cooper visit the premises. This requires the wineries or distilleries to have additional warehouse space available to house the empty barrels awaiting servicing.

SUMMARY OF THE INVENTION

The present invention relates to a trapdoor in a barrel used for storing and aging alcoholic spirits or wine to allow ready access to the interior of the barrel. Accessing the interior of a barrel after construction and sealing of the head has been problematic. This invention provides a barrel which contains a convenient, fast and simple entry point for accessing the interior area of the barrel for addition and removal of material for aging the wine or spirits.

The barrel of the present invention contains a removable trapdoor which fits snugly into an aperture in the barrel and which is easily removed from the aperture, thereby providing for easy access to the interior of the barrel. The present invention provides distinct advantages over the prior art because it allows a worker lacking the skills of a cooper to remove or replace the wood chips or additional staves inside the barrel without removing a barrel head. Since the wood replacement can be done by regular employees, the barrels can be serviced when needed or convenient, rather than accumulating a large number of barrels for a cooper to service at one time.

The present invention relates to a barrel, comprising a body having a top end, a middle portion, a bottom end, an interior surface, and an exterior surface; a first head and a second head, the first head toward the top end, the second head toward the bottom end; a bunghole; a removable trapdoor having a geometrical shape, edges, an inner surface and an outer surface; and an aperture having a similar geometrical shape to the geometrical shape of the trapdoor, where the trapdoor is received and retained therein.

More particularly, the present invention comprises a wooden barrel with a removable trapdoor, the barrel comprising: a body having a top end, a middle portion, a bottom end, an interior surface, and an exterior surface; a first head and a second head, the first head toward the top end, the second head toward the bottom end; a bunghole; the removable trapdoor having a geometrical shape, edges, an inner surface and an outer surface; an aperture having a similar but slightly larger geometrical shape to the geometrical shape of the trapdoor, where the trapdoor is received and retained therein; the aperture being sized and shaped to receive the trapdoor with the aperture edges abutting and able to be in intimate contact with the trapdoor edges when the trapdoor is inserted into the aperture; the aperture edges being beveled; the trapdoor edges being beveled; the surface area of the trapdoor outer surface being greater than the surface area of the trapdoor inner surface; the aperture being located in the barrel body middle portion between two adjacent hoops; the barrel body comprised of a multiplicity of wooden staves bound in assembled relationship with at least two hoops wrapped perpendicularly around the multiplicity of wooden staves, each said wooden stave in said multiplicity of wooden staves having a width; the aperture located in one wooden stave of the multiplicity of wooden staves; the aperture being the width of one wooden stave; the trapdoor being composed of material similar to the barrel; and the bunghole being located in the trapdoor.

Additionally, a seal material may be compressed between the trapdoor edges and the aperture edges, forming a liquid-tight seal when the trapdoor is inserted into the aperture. The seal material may consist of cork, rubber, neoprene, silicone, plastic or any suitable sealing material. In an alternate embodiment, the trapdoor may be composed of material different from that used for the barrel, such as wood, rubber, plastic or any suitable material. In a further alternate embodiment, the barrel may be constructed of suitable metal or synthetic material and may be of any size or shape.

In the preferred embodiment, the aperture is located in a single stave between two adjacent hoops, with the aperture extending beneath the two adjacent bilge hoops. The two hoops are loosened to allow insertion and extraction of the trapdoor. The hoops, in their tightened position, secure the trapdoor in the aperture.

In a further alternate embodiment, at least two brackets may project from an exterior surface of the barrel in proximity to and approximately parallel to opposed edges of the aperture, and at least two securing members are receivably accepted and clasped by the at least two brackets. In a further alternate embodiment, a portion of the aperture edges contains a groove approximately parallel to the aperture edges, a mating lip protrudes from a reciprocal portion of the trapdoor edges, and the groove receives and accepts the mating lip. A further embodiment further comprises at least two flange mechanisms affixed through and to the trapdoor inner surface, each flange mechanism having a flange and a screw, the screw having a head, a shaft and a tip, the shaft and the tip driven through the trapdoor from the outer surface to the inner surface, the screw head resting against the trapdoor outer surface, the screw tip attached to the flange which rotates when the screw head is rotated, the flange rotating from an insertion position resting against the inner surface of the trapdoor to a securing position resting against the interior surface of the barrel when the screw head is rotated. The flange mechanism is composed of material, such as stainless steel, which does not chemically react with the wine or spirits in an adverse manner. In a further embodiment, at least one handle is attached to the outer surface of the trapdoor.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 1:
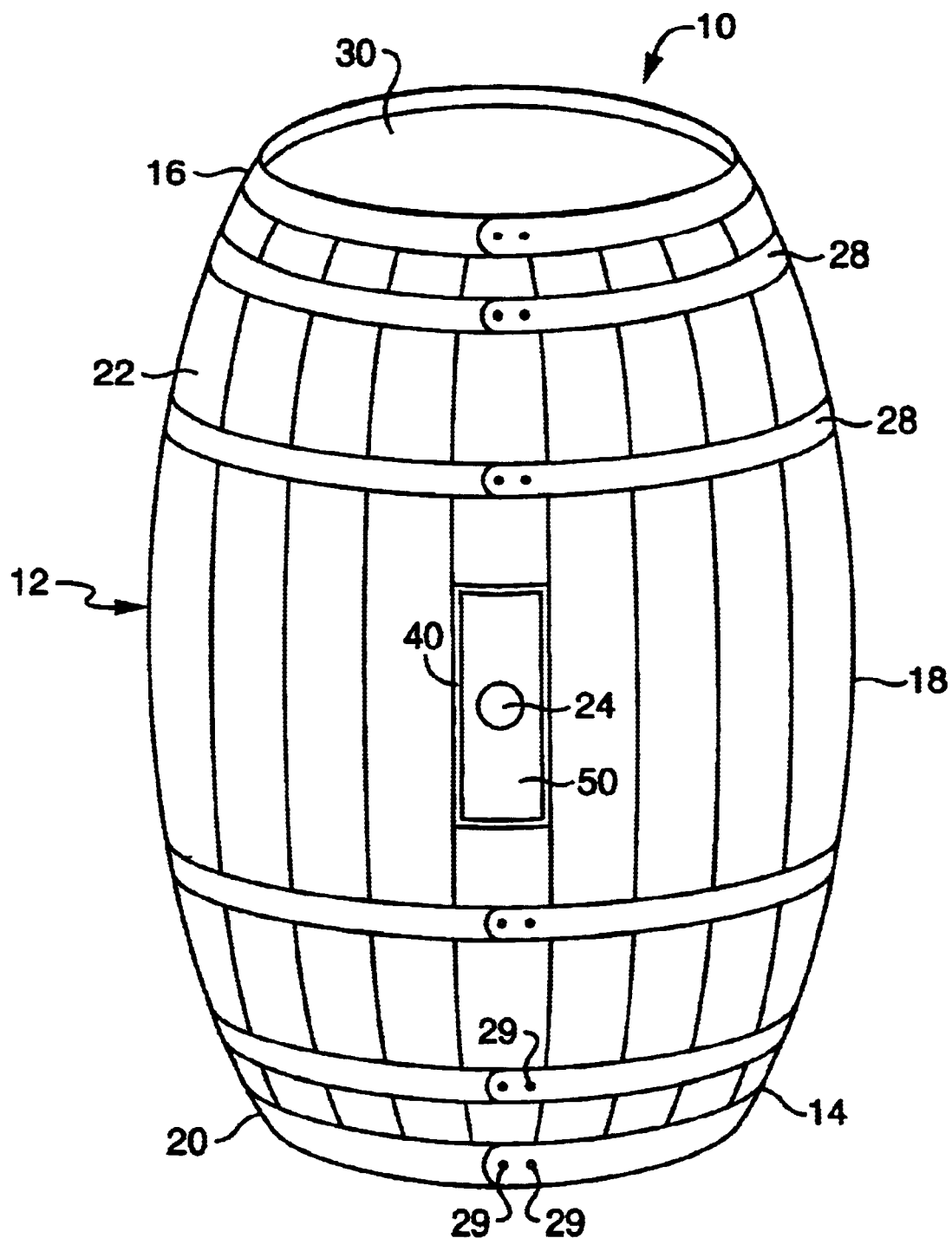
FIG. 1 shows a front view of one embodiment of the present invention, depicting a wooden barrel with an aperture located in the barrel body, the aperture being located on one stave between two adjacent hoops, with the trapdoor inserted in the aperture and a bunghole in the trapdoor.
Figure 2:
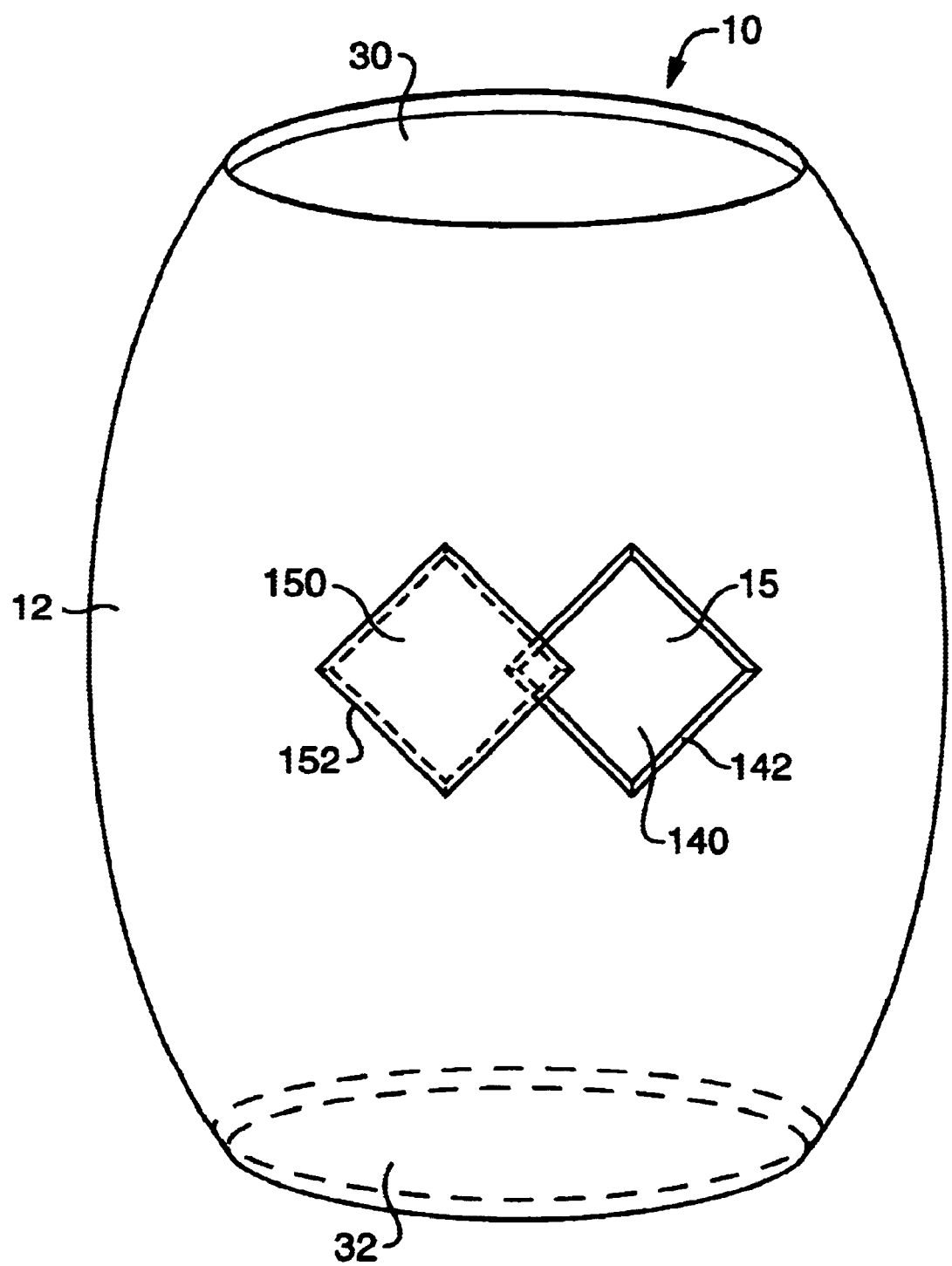
FIG. 2 shows an exploded front view of an alternate embodiment of the present invention, depicting a barrel with an alternative geometrically shaped aperture and trapdoor.
Figure 3:
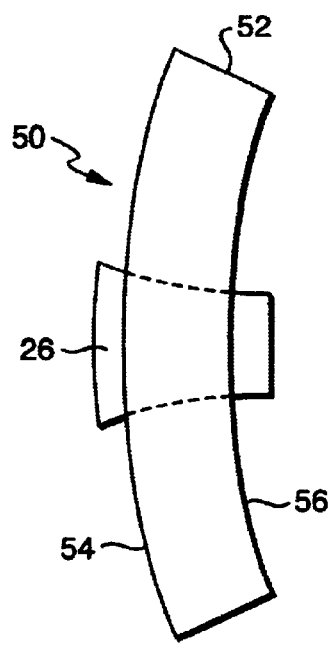
FIG. 3 shows a side view of the trapdoor of FIG. 1, depicting the beveled edges of the trapdoor and a bung inserted in the bunghole in the trapdoor.

In the barrel 10 of the embodiment shown in FIG. 1, an aperture 40 is located in the barrel body 12, most preferably in the middle portion 18 of the body 12 between two of the barrel support hoops 28. Hoops 28 are shown in FIG. 1 as metal strips held by rivets 29. The two hoops closest to the top 16 and bottom 20 ends are known as "head hoops". The two hoops 28 closest to the barrel middle portion 18 are known as "bilge hoops". The two hoops 28 between the head hoops and the bilge hoops are known as "quarter hoops". As best shown in FIGS. 1–2, the aperture 40 may be of any size and geometric shape which will accommodate insertion or removal of a rack or the additional wooden staves or wood pieces used for flavoring. As best shown in FIG. 1, the aperture 40 in a wooden barrel 10 is located on one stave 22 and is preferably the width of that stave 22. The size of the aperture 40 should be no larger than required, in order to maximize the structural integrity of the barrel 10, and most preferably measures no more than six inches at its widest point or points. As best shown in FIGS. 2–3, 5, and 8–9, the edges 42, 142 of the aperture 40, 140 are typically beveled, so that the aperture surface area on the interior 15 of the barrel is smaller than the aperture surface area on the exterior 14 surface of the barrel. The trapdoor 50 is the same geometric shape as the aperture 40 and is only slightly smaller in size, so that the trapdoor 50 is insertable into and removable from the aperture 40. The edges 52 of the trapdoor are cut with the same bevel as the aperture 40, so that when the trapdoor 50 is inserted, the trapdoor edges 52 may be in intimate contact with the aperture edges 42 along the entire length of all edges, forming a liquid tight seal. The beveled edges 42 of the aperture 40 accept and support the trapdoor 50 and prevent it from falling or being pushed into the interior 15 of the barrel.

Figure 5:
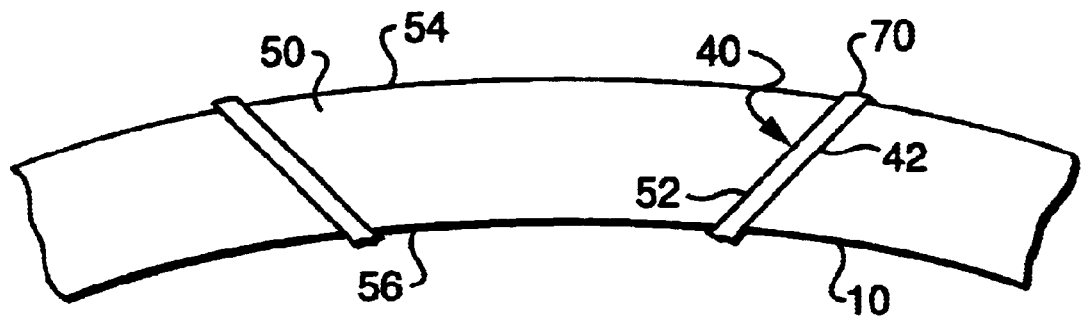
FIG. 5 shows a cross-sectional view of an alternate embodiment of the present invention, depicting a trapdoor inserted in the aperture and a seal material compressed between the trapdoor edges and the aperture edges.

The trapdoor 50 may be made of any of a variety of materials which will not adversely chemically react with the stored liquid, such as wood, plastic or rubber. The trapdoor 50 is preferably made of the same material as the barrel 10. As shown in FIG. 5, a seal or gasket 70 made of a suitable bonding or sealing material may be placed against the edges 42 of the aperture 40, so that when the trapdoor 50 is inserted, the seal or gasket 70 is compressed between the edges 42, 52 of the respective aperture 40 and trapdoor 50, forming a liquid tight seal. The seal or gasket 70 may be composed of any of a variety of materials which will not adversely chemically react with the stored liquid, such as cork, plastic, neoprene or rubber.

Figure 9:
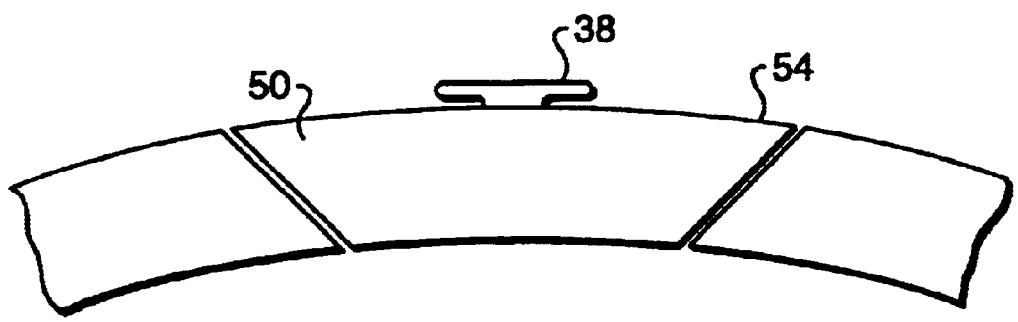
FIG. 9 shows a cross-sectional view of an alternate embodiment of the present invention, depicting an aperture and trapdoor with beveled edges where a handle is attached to the outer surface of the trapdoor.

In the embodiment depicted in FIG. 1, the bunghole 24 is located in the trapdoor 50 to provide an easy method for grasping the trapdoor 50 and removing it from the aperture 40. A worker would extract the bung 26 (FIG. 3) from the bunghole 24 and then insert one or more fingers or an instrument into the bunghole 24 and apply upward pressure to the inner surface 56 (FIG. 3) of the trapdoor 50, pulling it from the aperture 40. However, as shown in FIGS. 2, 4–5, and 7–9 it is not required that the bunghole 24 be located in the trapdoor 50, 150, 250, 350. The trapdoor 50, 150, 250, 350 may be removed by inserting a wedge into the small space between the aperture 40, 140, 340 and trapdoor edges 52, 152, 352 and then urging the trapdoor 50, 150 upward. Further, as shown in FIG. 9, any suitable handle 38 or handles for grasping may be affixed to the trapdoor outer surface 54, whereby the trapdoor would be pulled free from the aperture when outward force is applied to the handle. The trapdoor 50 may be secured in the aperture 40 by applying inward pressure on the outer surface 54 of the trapdoor 50. Further, as shown in FIGS. 4 and 6–8, any suitable locking mechanism may be used to securely hold the trapdoor in the aperture.

Figure 4:
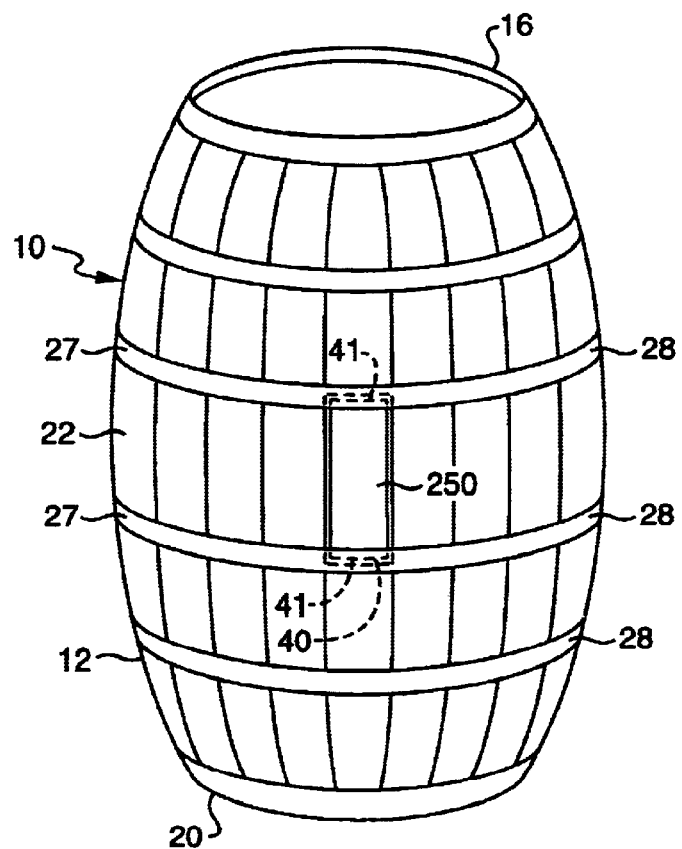
FIG. 4 shows a front view of the preferred embodiment of the present invention, depicting a wooden barrel with a geometrically shaped aperture with trapdoor inserted, where the aperture is located on one stave between and extending beneath the two adjacent bilge hoops, with the trapdoor inserted in the aperture.

In the preferred embodiment depicted in FIG. 4, the aperture 40 is preferably located in a single stave 22 between two adjacent hoops 28 with the aperture extending beneath the two adjacent hoops 28. As shown, aperture 40 extends beneath the two bilge hoops 27, although it could extend beneath hoops 28 closer to the top 16 and bottom 20 ends. To cut the aperture 40, bilge hoops 27 are "loosened", that is they are moved toward respective top 16 and bottom 20 ends. The trapdoor 250 cuts are then made in stave 22. With the barrel hoops 27 loosened, the trapdoor 250 can be inserted into or extracted from aperture 40. The barrel hoops 27, in their tightened position, secure the trapdoor 250 in the aperture 40. If desired, a bead of silicon-type caulking seal 41 can be placed at the cut stave 22 ends of aperture 40 to aid in sealing trapdoor 250 in aperture 40. In addition to caulking, other seals 70 as described above can be used. This is felt to be the preferred embodiment because the tightening of bilge hoops 27 helps the trapdoor 250 and aperture 40 form a liquid tight engagement.

Figure 6:
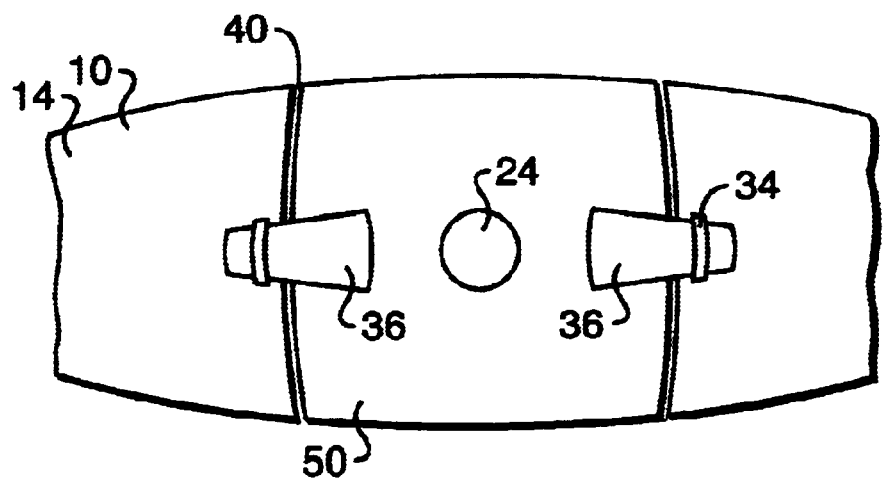
FIG. 6 shows a top view of an alternate embodiment of the present invention, depicting a trapdoor inserted in the aperture, the trapdoor having a bunghole, and two brackets projecting from an exterior surface of the barrel in proximity to and approximately parallel to opposed edges of the aperture with two securing members inserted in the brackets.
Figure 7:
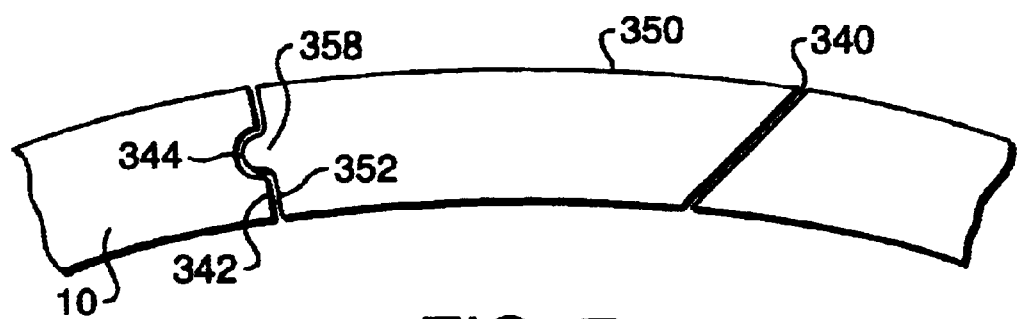
FIG. 7 shows a cross-sectional view of an alternate embodiment of the present invention, depicting an aperture with a portion of the aperture edges containing a groove approximately parallel to the aperture edges and depicting a trapdoor with a mating lip protruding from a reciprocal portion of the trapdoor edges, where the groove receives and accepts the mating lip.
Figure 8:
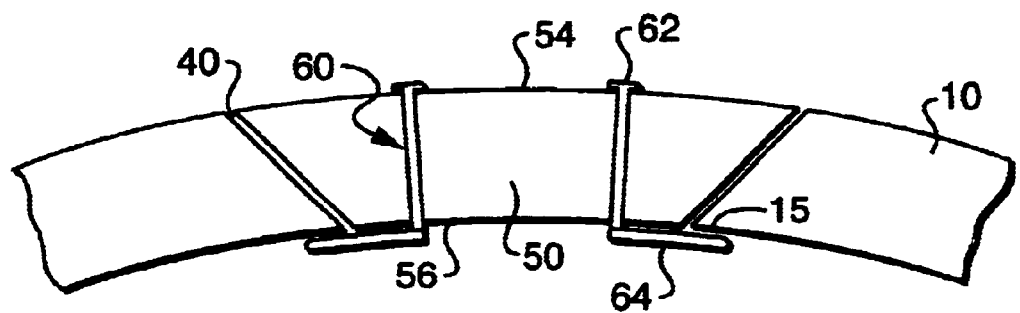
FIG. 8 shows a cross-sectional view of an alternate embodiment of the present invention, depicting an aperture and trapdoor with beveled edges where two flange mechanisms are mounted through the trapdoor and rotated into a securing position against the interior surface of the barrel.

In an alternate embodiment depicted in FIG. 6, brackets 34 may be affixed on the barrel 10 near the edges 42 of the aperture 40 or on the trapdoor 50 itself, so that one or more wedges 36 of wood or other securing material may be inserted through the brackets 34, placing inward pressure upon the trapdoor 50 and holding the trapdoor edges 52 securely against the aperture edges 42. In an alternate embodiment depicted in FIG. 8, rotating flange mechanisms 60 may be affixed through and to the inside of the trapdoor 50, so that the flanges 64 may be turned by a screw 62 to rest against the interior surface 15 of the barrel, securing the trapdoor 50 into the aperture 40 from the interior of the barrel. In a further alternate embodiment depicted in FIG. 7, a portion of the edges 342 of the aperture 340 contains a groove 344 approximately parallel to the aperture edges 342, and a mating lip 358 which protrudes from a reciprocal portion of the trapdoor edges 352 is received and accepted by the groove 344. The trapdoor 350 portion containing the mating lip 358 is fitted first into the aperture 340 portion containing the groove 344. Inward pressure is then exerted upon the trapdoor 350, snapping the trapdoor 350 into the appropriate position within the aperture 340.

An advantage of the present invention is that wood flavoring pieces or staves can be much more easily removed through the trapdoor 50, 150, 250, 350 than through the bunghole 24 or by removing either a first head 30 from the barrel 10 top end 16 or a second head 32 from the barrel 10 bottom end 20. Wood chips will jam and pack with each other and make removal through the bunghole difficult or impossible. Likewise, larger wood rods or strips are very difficult to remove through the bunghole because of their overall size and the difficulty of orienting them with respect to the hole for removal through the hole.

The foregoing detailed description is given primarily for clearness of understanding and no unnecessary limitations are to be understood therefrom, for modifications can be made by those skilled in the art upon reading this disclosure and may be made without departing from the spirit of the invention.

What is claimed is:

1. A barrel, comprising:

a. a body having a top end, a middle portion, a bottom end, an interior surface, and an exterior surface, said body comprised of a plurality of wooden staves bound in assembled relationship with at least two hoops wrapped around said plurality of wooden staves;

b. a first head and a second head, said first head toward said top end, said second head toward said bottom end;

c. a bunghole;

d. a removable trapdoor having a geometrical shape, edges, an inner surface and an outer surface; and e. an aperture located in said body between two adjacent hoops of said at least two hoops and extending at least partway beneath said two adjacent hoops, said aperture having edges and a similar geometrical shape to said geometrical shape of said trapdoor, said trapdoor being receivable by said aperture.

2. The barrel as recited in claim 1, where said aperture is sized and shaped to receive said trapdoor with said aperture edges abutting and in intimate contact with said trapdoor edges when said trapdoor is inserted into said aperture.

3. The barrel as recited in claim 1, where the surface area of said trapdoor outer surface is greater than the surface area of said trapdoor inner surface.

4. The barrel as recited in claim 1, where said aperture is located in said middle portion of said body.

5. The barrel as recited in claim 1, where said bunghole is located in said trapdoor.

6. The barrel as recited in claim 1, where each wooden stave in said plurality of wooden staves has a width, where said aperture is located in one wooden stave of said plurality of wooden staves and where said aperture is not wider than the width of said one wooden stave.

7. The barrel as recited in claim 1, where said aperture has cut stave ends beneath said two adjacent hoops.

8. A barrel, comprising:

a. a body having a top end, a middle portion, a bottom end, an interior surface, and an exterior surface;

b. a first head and a second head, said first head toward said top end, said second head toward said bottom end;

c. a bunghole;

d. a removable trapdoor having a geometrical shape, edges, an inner surface and an outer surface;

e. an aperture having edges and a similar geometrical shape to said geometrical shape of said trapdoor, said trapdoor being receivable by said aperture;

f. said bunghole located in said trapdoor;

g. said body comprised of a plurality of wooden staves bound in assembled relationship with at least two hoops wrapped around said plurality of wooden staves;

h. said aperture located in said body between two adjacent hoops of said at least two hoops and extending at least partway beneath said two adjacent hoops;

i. each wooden stave in said plurality of wooden staves having a width;

j. said aperture located in one wooden stave of said plurality of wooden staves;

k. said aperture being not wider than the width of said one wooden stave; and l. said aperture having cut stave ends beneath said two adjacent hoops.

* * * * *

UNITED STATES PATENT AND TRADEMARK OFFICE
CERTIFICATE OF CORRECTION

PATENT NO. : 6,616,002 B2
DATED : September 9, 2003
INVENTOR(S) : William J. Weil It is certified that error appears in the above-identified patent and that said Letters Patent is hereby corrected as shown below:

Title page,
Item [*] Notice, delete "0 days" and insert instead -- 9 days --.

Column 8,
Line 30, insert the following claim:
    9. The barrel as recited in claim 1 further comprising a seal material compressed between said trapdoor edges and said aperture edges where said seal material forms a liquid-tight seal when said trapdoor is inserted into said aperture.

Signed and Sealed this

Twenty-sixth Day of April, 2005

JON W. DUDAS
*Director of the United States Patent and Trademark Office*